July 31, 1945.  E. I. FENTON  2,380,587
DISTRESS SIGNAL DEVICE FOR AIRCRAFT, ETC
Filed March 1, 1943
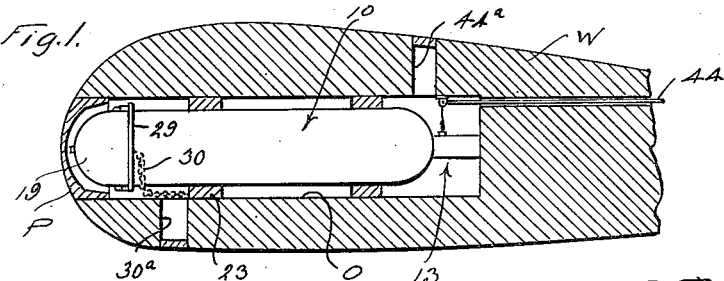
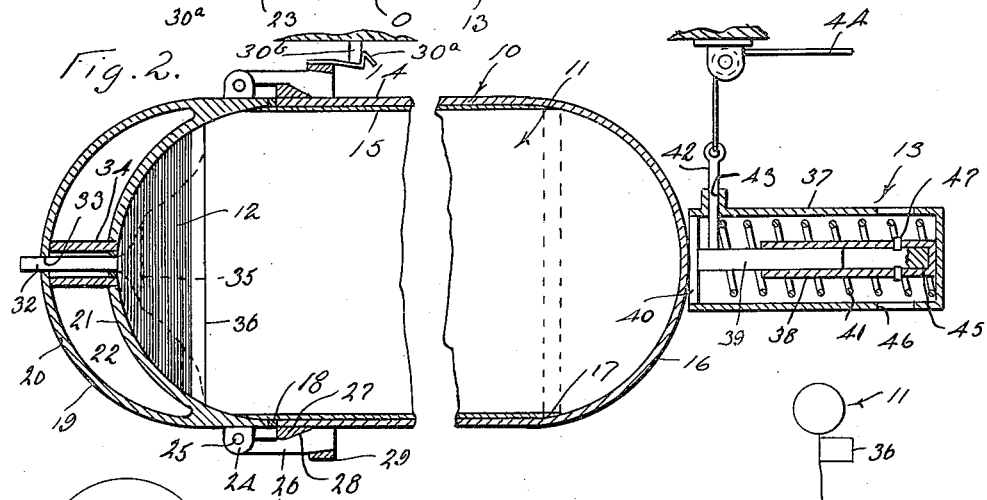
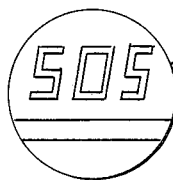
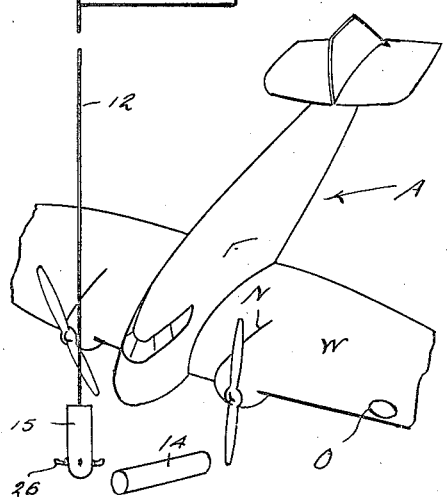
Inventor
Estil Irvin Fenton
by W. Hill Aspwell
Attorney Patented July 31, 1945

2,380,587

UNITED STATES PATENT OFFICE 2,380,587

DISTRESS SIGNAL DEVICE FOR AIRCRAFT, ETC.

Estil Irvin Fenton, Long Beach, Calif.

Application March 1, 1943, Serial No. 477,529

11 Claims. (Cl. 116—124)

This invention relates to signal devices and relates more particularly to a distress signal device particularly well suited for disclosing the location of an aircraft that has crashed or made a forced landing. A general object of this invention is to provide a practical, dependable distress signal or rescue signal for aircraft, etc. that automatically goes into effective operation when the aircraft crashes or strikes the ocean or other body of water, and that may be manually released for operation in the event of a forced landing.

Another object of this invention is to provide a signal device of the character referred to that may be normally contained entirely within the wing or other selected part of the aircraft and that is automatically thrown free of the aircraft for immediate operation when the craft crashes.

Another object of this invention is to provide a signal device of the character referred to that is forcibly ejected from the plane for immediate operation by a simple, manual act on the part of the pilot or other occupant of the craft, and that is forcibly and automatically ejected for operation in the event the plane becomes submerged or partially submerged in the water.

Another object of this invention is to provide a rescue signal device of the character referred to that embodies a balloon automatically released to rise into the air when the device is thrown free or ejected from the aircraft.

Another object of this invention is to provide a distress signal device of the character mentioned in which the balloon or the restraining line of the balloon carries a movable element in the form of a distress signal flag or pennant and the balloon may be colored, coated with luminous material, or provided with insignia or distress signals. The waving flag kept in motion by the upper air currents is effective in attracting the attention of rescuers and the balloon is colored or marked to be conspicous and plainly visible from the earth's surface and from aircraft.

Another object of this invention is to provide a signal device of the character referred to in which the balloon, the anchoring line, and the flag are contained in a small cartridge readily housed in the aircraft and are automatically forced out of the cartridge by the expansive action of the gas under pressure within the balloon when the cartridge is ejected or thrown clear of the aircraft.

Another object of this invention is to provide a signal device of the character mentioned in which a part of the capsule or cartridge case forms an effective anchor for the balloon so that the balloon remains above the aircraft to form an effective distress signal therefor.

Another object of this invention is to provide a signal device of the character referred to in which the portion of the cartridge case that is secured to the anchor line of the balloon to form an anchor is buoyant or partially buoyant so that it will not sink an excessive depth in the water and therefore cannot carry the balloon down into the water.

Another object of the invention is to provide a signal device of the character mentioned in which the balloon may serve as a means for locating a craft that has sunk. The balloon is connected with a buoy by a restraining line and a second line of suitable length may connect the buoy with the sunken craft so that the balloon and buoy effectively indicate the position of the craft.

A further object of this invention is to provide a signal device of the character mentioned that is very light in weight and simple and inexpensive to manufacture.

The various objects and features of my invention will be fully understood from the following detailed description of a typical preferred form and application of the invention, throughout which description reference is made to the accompanying drawing, in which:

Fig. 1 is a fragmentary diagrammatic sectional view of a portion of an aircraft wing illustrating the device of the present invention in its normal position therein. Fig. 2 is an enlarged longitudinal detailed sectional view of the device removed from the aircraft. Fig. 3 is a perspective view of a crashed aircraft illustrating the manner in which the device of the invention forms an effective signal, and Fig. 4 illustrates another way in which the device may operate.

The signal devices of the invention may be carried by vehicles and craft of various kinds. For example, it may be carried by land vehicles, ships, life rafts, etc. In the drawing I have illustrated a typical embodiment of the invention arranged in an aircraft A to be automatically or manually released therefrom for operation. It is to be understood that the invention is not to be construed as limited or restricted to the particular form or application herein disclosed, but is to be taken as including any features or modifications that may fall within the scope of the claims.

The aircraft illustrated in the drawing has the usual fuselage F, wings W, motor nacelles N and other elements common to aircraft of this character. The signal devices of the invention are preferably arranged in a leading edge portion of the craft. In practice it will probably be preferred to arrange the signal devices in the leading edge portions of the wings W and to provide one signal device in the outer end portion of each wing.

Fig. 1 is a diagrammatic sectional view of a portion of a wing W of the aircraft A and illustrates a pocket or opening O provided in the wing to receive the signal device. The opening O is closed at its outer end by a cap or plug P. The plug P is shaped so that its outer surface conforms to and forms an unbroken continuation of the leading surface of the wing W. In accordance with the invention the plug P is press-fitted in the opening O, or otherwise engaged with the wing W, in such a manner that it will be easily displaced and thrown free by a forward thrust from the signal device.

The signal device of the present invention may be said to comprise, generally, a shell or case 10 for arrangement in the opening O of the wing W, a balloon 11 in the case 10 having a retaining line 12 connected with a part of the case 10, and means 13 for forcibly ejecting the case 10 from the opening O to permit the release of the balloon 11 from the case.

The case 10 is an elongate hollow structure proportioned to be received in the opening O and to contain the balloon 11 and the case is constructed so that it may readily open to permit the escape of the inflated balloon. In the preferred construction the case 10 includes two sections 14 and 15. The sections 14 and 15 are elongate hollow members and are arranged in telescopic relation. The section 14 which I will term the outer section has a closed inner or rear end 16. The wall or end 16 is partially spherical. The section 15 which is the inner section of the case 10 slidably enters the forward end of the outer section 14 and preferably extends rearwardly to adjacent the end 16. The rear edge of the inner section 15 preferably carries a sealing ring 17 of rubber, or the like, for slidably sealing with the internal surface of the section 14 to assist in preventing the entrance of moisture into the case and to prevent the balloon 11 from fouling the end of the inner section 15. The forward portion of the inner section 15 has an annular shoulder opposing the end of the outer section 14 and a sealing ring 18 is engaged between the shoulder and the end of the section 14 to assist in preventing the entrance of moisture into the case 10.

The forward end of the inner case section 15 is closed by what I will term a cap 19. The cap 19 may be integrally joined with the inner section 15. The cap 19 comprises two spaced rounded or partially spherical walls 20 and 21. The walls 20 and 21 are spaced apart to leave a substantial air chamber 22. The chamber 22 is provided in the cap 19 to give the inner case section 15 buoyancy when submerged in water and is sufficiently large relative to the weight of the section 15 so that it prevents the section from sinking an excessive distance. In this connection it is to be observed that the inner section 15 may be relatively light in weight and may have a wall thickness less than the wall thickness of the outer case section 14. As illustrated in Fig. 1 of the drawing, the case 10 just described may be supported in the opening O of the wing W by suitable guides 23 to readily move forwardly from the opening. The cap 19 of the inner case section 15 is received within the plug P and is cooperable with the plug to force the plug out of the opening O.

Latch means is provided to connect the two case sections 14 and 15 and normally resist the tendency of the inflated balloon 11 to force the sections apart. The latch means includes a plurality of circumferentially spaced split lugs or yokes 24 on the cap 19 adjacent its inner end. Pivot pins 25 pivotally secure latches 26 in the yokes 24. Spaced lugs 27 are provided on the exterior of the outer section 14 adjacent its forward end. The lugs 27 have pitched or inclined rear surfaces 28 and the noses of the pivoted latches 26 have similar surfaces for cooperating with the lug surfaces 28. A ring 29 surrounds the case 10 to engage the several latches 26. The ring 29 cooperates with the latches 26 to retain them in engagement with the surfaces 28 so that they prevent the case 10 from opening under internal pressure. The internal surface of the ring 29 is pitched or rearwardly convergent and the external surfaces of the latches 26 are correspondingly pitched so that the holding ring 29 and the latches may be easily disengaged. The ring 29 is latched or coupled to the aircraft to be freed from the latches 26 when the cartridge or case 10 is thrown forwardly from the opening O. Circumferentially spaced spring latches 30ᵃ are secured to the ring 29 and latch with lugs 30ᵇ in the opening O when the unit is inserted in the opening. The latches 30ᵃ are effective in holding the ring 29 against outward movement. When the device is thrown or forced forwardly the latches 30ᵃ hold the ring 29 against movement so that the latches 26 are freed from the ring. Upon the disengagement of the latches 26 from the ring 29 the latches are free to swing out of engagement with the lugs 27, the inclined surfaces 28 serving to pivot the latches outwardly. The latches 26 are preferably formed to swing to positions where they project laterally from the section 14 to form effective grapples or anchor parts. This position of the latches 26 is illustrated in Fig. 3. A chain 30 may be provided to slackly tie the ring 29 to the craft. A normally closed hand hole or access opening 30ᵃ may be provided in the wing W to facilitate the securing of the chain 30 to the wing.

The balloon 11 is initially or normally contained within the case 10. The balloon 11 occupies substantially the entire interior of the case and in accordance with the invention contains gas under pressure. Any selected gas that is lighter than air may be employed, but it will usually be found preferable to employ hydrogen gas because of its greater lifting power. The balloon 11 may be of any selected configuration when inflated and free in the atmosphere. In the particular case illustrated in the drawing the balloon 11 is in the form of a sphere when expanded and free of the case 10. It is to be understood that when the balloon 11 is confined under pressure within the case 10 it conforms to the interior of the case.

Means is provided whereby the balloon may be inflated with the gas under pressure when within the case 10. A valve stem 32 projects from what may be considered the forward end of the balloon 11. The valve stem 32 may carry a conventional tire valve which admits gas under pressure but which prevents the discharge of the gas from the balloon. The valve stem 32 extends through aligned openings 33 in the spaced walls 20 and 21 of the cap 19 and projects from the front of the cap to be accessible. A tube 34 is engaged between and sealed with the spaced walls 20 and 21 so that the openings 33 are kept out of communication with the chamber 22 and cannot admit water to the chamber. With the latches 26 held in latching engagement with the lugs 27 a suitable source of hydrogen or other selected gas under pressure is connected with the valve stem 32 to introduce the gas to the balloon 11 within the case 10. In practice the balloon 11 confined within the case 10 may carry gas under substantial pressure to give the balloon the required lifting power. It will be noted that the telescopically engaged sections 14 and 15 give the case 10 ample strength to withstand the internal pressures exerted by the inflated balloon 11.

The anchor line or restraining line 12 for the balloon 11 has one end suitably fixed to the balloon and has its other end attached to the case section 15 or the cap 19 of that section. The line 12 may be a light, strong stranded wire or cable. As illustrated in Fig. 2 of the drawing the line 12 is wound or spooled on the forward portion of the balloon 11 to be within the wall 21 of the cap 19. A rubber reinforcing collar 35 around the inner end of the valve stem 32 may form a support for the wound or spooled line 12. The line 12 spooled on the tapering forward end of the balloon 11 is adapted to freely unreel without danger of tangling or fouling. It is preferred to make the line 12 of substantial length, say about one thousand feet.

In accordance with the invention the balloon 11 may be given any finish or color that is effective in attracting the attention of rescuers. The material constituting the balloon 11 may be dyed or painted selected colors, may be striped in different colors, etc. In the case illustrated the upper portion of the balloon carries the lettering "S O S" while the lower portion of the balloon is striped. In addition to the attractive and distinctive markings on the balloon proper the balloon anchoring line 12 carries a moving element in the form of a pennant or flag 36. The flag 36 may be attached to the line 12 directly under or adjacent the balloon 11 and is adapted to be put into motion by the air currents. The flag 36 may bear any desired insignia and may be different colors, etc. It is preferred to form the flag 36 of a light weight fabric so as to be put into motion by light winds and air currents. The moving or fluttering flag 36 is very effective in attracting the attention of the rescuers. The flag 36 is wound or spooled about the forward portion of the balloon 11 adjacent the spooled line 12 when the assembly is packed within the case 10.

The means 13 is operable to project the case 10 from the craft A. The means 13 is operable to project the case 10 from the craft A in the event the craft makes a forced landing without substantial impact, and in the event the craft is forced down at sea or crashes at sea. The means 13 includes a tubular or cup-like housing 37 fixed in the opening O of the wing W at the inner end of the case 10. The housing 37 has an open forward end which opposes the rear wall 16 of the case 10. A cylinder 38 is centrally and longitudinally arranged within the housing 37 in spaced relation to the housing walls. The inner or rear end of the cylinder 38 is closed and is fixed to the end wall of the housing 37. The forward end of the cylinder 38 is open and slidably receives a plunger 39. A head 40 is fixed on the forward end of the plunger 39 and cooperates with the end wall 16 of the case 10.

The means 13 further includes a coiled compression spring 41 arranged around the cylinder 37 in spaced relation thereto and bearing rearwardly against the end wall of the housing 37. The forward end of the spring 41 engages a pin 42. The pin 42 is slidably engaged in an opening 43 provided in the wall of the housing 37. The spring 41 is engaged under compression between the rear end wall of the housing 37 and the pin 42. The pin 42 is in the nature of a holding latch for the spring 41 and is manually controlled. The pin 42 is adapted to be controlled or released from a remote point, say the cabin or cockpit of the craft A. An operating cable 44 is secured to the outer end of the pin 42 and operates over one or more directing pulleys 42 to extend to a convenient point for manual operation. When the line 44 is operated or pulled the pin 42 is retracted from the housing 37 and the spring 41 comes into engagement with the head 40 to exert a forward force on the case 10. The spring 41 is of sufficient strength and length to push the case 10 free and to force the plug P from the opening O. The spring 41 is operable to push the case 10 forwardly a sufficient distance to disengage the latch held ring 29 from the latches 26 and thus free the latches so that the confined balloon may separate the casing sections 14 and 15. The expansion of the balloon 11 separates the sections of the case 10 and the balloon rises into the air. A normally closed access opening 44ª may be provided in the wing W to facilitate the latching or installation of the pin 42.

The means 13 further includes a pressure developing means for rendering the signal effective when the craft A crashes at sea or makes a forced landing at sea. This means includes a material 45 in the rear portion of the cylinder 38 that generates gas pressure when contacted by water. The material 45 may be carbide and is supplied in sufficient quantity to generate a substantial pressure within the cylinder 38. Openings 46 are provided in the wall of the housing 37 to admit water to the interior of the housing and check valves 47 are provided in the wall of the rear portion of the cylinder 38. The check valves 47 are formed to admit the water to the interior of the cylinder 38 and automatically close against the escape of pressure when pressure is generated within the cylinder. In the event the aircraft A crashes at sea or sinks following a forced landing water enters the wing W and passes through the openings 46 and the valves 47 to the interior of the cylinder 38. Upon the water contacting the material 45 gas pressure is developed within the cylinder. The pressure thus developed forces the plunger 39 forwardly and the plunger in turn forces the case 10 forwardly. This displaces the plug P from the opening O and projects the case 10 a sufficient distance to free the ring 29 from the latches 26. When this occurs the balloon 11 expands to separate the sections 14 and 15 and the balloon is freed to rise in the air. The case section 15 attached to the line 12 forms an anchor and as the case section remains at a point immediately adjacent the craft A the balloon 11 is held captive immediately adjacent the craft. The sealed chamber 22 of the section 15 makes the section buoyant and the section cannot sink in the water to drag down the balloon 11.

It is believed that the operation of the distress signal device will be readily understood from the foregoing detailed description. The balloon 11, the line 12 and the flag 36 are readily packed within the case 10 and the balloon is inflated to the desired extent with gas under pressure in the manner described above. The case 10 held sealed or closed by the latches 26 forms a compact unit that is easily mounted in the opening O.

If the aircraft crashes, the inertia of the device accompanying the impact carries the device forwardly so that the plug P is displaced and the case 10 is thrown clear of the aircraft. When this occurs the ring 29 which is secured to the aircraft by the latches 30ª is released from the latches 26. The expansive force of the compressed inflated balloon 11 moves the sections 14 and 15 apart and the latches 26 are swung free from the pitched lugs 27. The expanding balloon 11 disengages the case sections 14 and 15 one from the other and the balloon is set free. The balloon rises from the section 15 and the line 12 unreels. As illustrated in Fig. 3 of the drawing the section 15 forms a weight or anchor at the lower end of the line 12 preventing the escape of the balloon. The balloon 11 together with the flag 36 is readily seen for many miles and rescuers are attracted by the colored balloon and the waving flag 36. It has already been described how the signal means may be put into operation by manually pulling on the line 44 and how the device is automatically made operative when water enters the cylinder 38. The line 12 is available as an effective antenna for a radio receiving or sending apparatus carried by the life raft, or life boat, of the wrecked aircraft.

Fig. 4 illustrates a somewhat different use or application of the invention. In this case the balloon 11 is anchored to the buoyant section 15, as above described, and the buoyant section 15 is in turn connected with the craft A by a line L. The line L may be normally spooled in the inner portion of the opening O and its ends are suitably secured to selected parts of the craft A and section 15. The line L may be light and of substantial length. If the craft A crashes and sinks at sea the balloon 11 rises in the air as above described and the section 15 floats in the water. The line L spools out as the craft A sinks. The sunken craft A forms an anchor and the line L forms an anchor line for the buoyant section 15. Thus, as illustrated in Fig. 4, the balloon is held anchored above the location of the craft A and is prevented from drifting away.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A signal device for aircraft and the like including a case carried by the craft to be thrown from the craft to be clear thereof upon a sudden impact of the craft, means carried by the craft to eject the case from the craft the case comprising two separable telescopically engaged sections, means holding the sections against separation while in the craft and releasable so the sections are freely separable upon the case being displaced from the craft, an inflated balloon contained under pressure within the case operable to separate the sections when the case is free of the craft and rise from the case upon the release of said means, and an anchor line connecting the balloon with one section of the case and connecting that section of the case to the craft so the balloon is anchored near the craft.

2. A signal device for aircraft and the like including a case carried by the craft to be thrown from the craft upon a sudden impact of the craft, the case comprising two separable telescopically engaged sections, means for holding the sections against separation releasable upon the case being displaced from the craft, an inflated balloon contained under pressure within the case operable to separate the sections and rise from the case upon the release of said means, a spooled line within the case having one end attached to the balloon and one end attached to a section of the case whereby said section forms an anchor for the balloon when the same is freed from the case, said section having an air chamber to be buoyant in water and a line connecting said section with the craft.

3. A signal device for aircraft and the like including a case, means for supporting the case on the craft for projection therefrom to be entirely clear thereof, the case comprising two telescopically engaged separable sections, latch means for holding the sections against separation releasable by a force tending to separate the sections, means for preventing the release of the latch means operable to free the latch means for release upon projection of the case from the craft, an inflated balloon contained under pressure within the case to exert a force tending to separate the sections and operable to release the latch means and separate the sections so as to be free to rise into the air upon the projection of the case from the craft, and means connecting the balloon with the craft for anchoring the balloon near the craft.

4. A signal device for aircraft and the like including a case, means for supporting the case on the craft for projection therefrom to be entirely clear thereof, the case comprising two telescopically engaged separable sections, latch means for holding the sections against separation releasable by a force tending to separate the sections, means for preventing the release of the latch means operable to free the latch means for release upon projection of the case from the craft, means for projecting the case from the craft, an inflated balloon contained under pressure within the case to exert a force tending to separate the sections and operable to release the latch means and separate the sections so as to be free to rise into the air upon the projection of the case from the craft, and an anchor line connecting the balloon with the craft so the balloon is anchored near the craft.

5. A signal device for aircraft and the like including a case, means for supporting the case on the craft for projection therefrom, the case comprising two telescopically engaged separable sections, latch means for holding the sections against separation releasable by a force tending to separate the sections, means for preventing the release of the latch means operable to free the latch means for release upon projection of the case from the craft, manually controllable spring means for projecting the case from the craft, an inflated balloon contained under pressure within the case to exert a force tending to separate the sections and operable to release the latch means and separate the sections so as to be free to rise into the air upon the projection of the case from the craft, and an anchor line connecting the balloon with the craft so the balloon is anchored near the craft.

6. A signal device for aircraft and the like including a case, means for supporting the case on the craft for projection therefrom, the case comprising two telescopically engaged separable sections, latch means for holding the sections against separation releasable by a force tending to separate the sections, means for preventing the release of the latch means operable to free the latch means for release upon projection of the case from the craft, means activated by water for projecting the case from the craft, and an inflated balloon contained under pressure within the case to exert a force tending to separate the sections and connected to one section of the case and operable to release the latch means and separate the sections so as to be free to rise into the air upon the projection of the case from the craft.

7. A signal device for aircraft and the like including a case adapted to be carried by a craft for projection therefrom, an inflated balloon in the case, a spooled line in the case having its opposite ends attached to the balloon and case, spring means for projecting the case from the craft, and manually releasable means for holding the spring means against operation, and means whereby the balloon is released from the case to rise from the case when the case is projected from the craft.

8. A signal device for aircraft and the like including a case adapted to be carried by a craft for projection therefrom, an inflated balloon in the case, a spooled line in the case having its opposite ends attached to the balloon and case, means for automatically projecting the case from the craft including a cylinder, a plunger in the cylinder, means for developing pressure in the cylinder to operate the plunger, the balloon being adapted to rise from the case when the case is projected from the craft.

9. A signal device for aircraft and the like including a case carried by the craft to be thrown from the craft upon a sudden impact of the craft, the case comprising two separable telescopically engaged sections adapted to separate, means for holding the sections against separation releasable upon the case being displaced from the craft, an inflated balloon held under pressure within the case and exerting a force tending to separate the sections and being related to the case so as to rise therefrom upon the sections separating when the case is projected from the craft, manually controlled spring means for projecting the case from the craft, and an anchor line connecting the balloon with the craft so the balloon is anchored near the craft.

10. A signal device for aircraft and the like including a case adapted to be carried by a craft for projection therefrom, an inflated balloon in the case, a spooled line in the case having its opposite ends attached to the balloon and case, spring means for projecting the case from the craft, and manually releasable means for holding the spring means against operation, and a remote control for the manually releasable means, the balloon being adapted to rise from the case when the case is projected from the craft.

11. A signal device for aircraft and the like including a case carried by the craft to be thrown from the craft upon a sudden impact of the craft, the case comprising two separable telescopically engaged sections, means for holding the sections against separation releasable upon the case being displaced from the craft, an inflated balloon contained under pressure within the case operable to separate the sections and rise from the case upon the release of said means, a line having one end attached to the balloon and one end to one of the sections, said section being buoyant in water to form a buoy for the balloon, and a second line attached to the craft and said buoyant section so that if the craft sinks it forms an anchor for the buoyant section.

ESTIL IRVIN FENTON.